United States Patent [19]

Johnson, Jr. et al.

[11] Patent Number: 5,406,599
[45] Date of Patent: Apr. 11, 1995

[54] SPACER GRID CELL FIXTURE SYSTEM

[75] Inventors: Garrett Johnson, Jr., Gladstone; Raymond A. King, Lynchburg; Elbert C. Minnick, III, Forest, all of Va.

[73] Assignee: B&W Fuel Company, Lynchburg, Va.

[21] Appl. No.: 225,038

[22] Filed: Apr. 8, 1994

[51] Int. Cl.⁶ ............................................ G21C 21/00
[52] U.S. Cl. .................................... 376/260; 29/723; 219/158; 269/40; 269/41; 976/DIG. 81
[58] Field of Search ........................ 376/260, 261; 976/DIG. 81; 269/40, 41, 111, 118, 287, 312, 909; 219/158, 161; 29/723, 906

[56] References Cited

U.S. PATENT DOCUMENTS 4,492,844  1/1985  Kobuck et al. ................... 376/261
4,522,330  6/1985  Kerrey et al. .................... 376/261

*Primary Examiner*—Daniel D. Wasil
*Attorney, Agent, or Firm*—Robert J. Edwards; D. Neil LaHaye

[57] ABSTRACT

A weld fixture for receiving and aligning the fuel rod contact points of a nuclear fuel bundle spacer grid. Two plates are provided with intersecting unequally spaced slots that define polygons on one side of each plate. Both plates have bores therethrough substantially at the slot intersections and in the slots adjacent the outer edges of the plates. Bores are provided through both plates in polygons that correspond to fuel assembly guide tube and instrument tube locations. These positions receive guide cell pins during use, some of which are hollow and are used to bolt the plates together over the spacer grid strips. Bores in each plate through the defined polygons receive alignment pins. Guide rods receive and align the plates through corner bores in each plate. The slots and pins in the facing plates align the critical fuel rod contact points in the spacer grid during the intersection welding process.

15 Claims, 9 Drawing Sheets

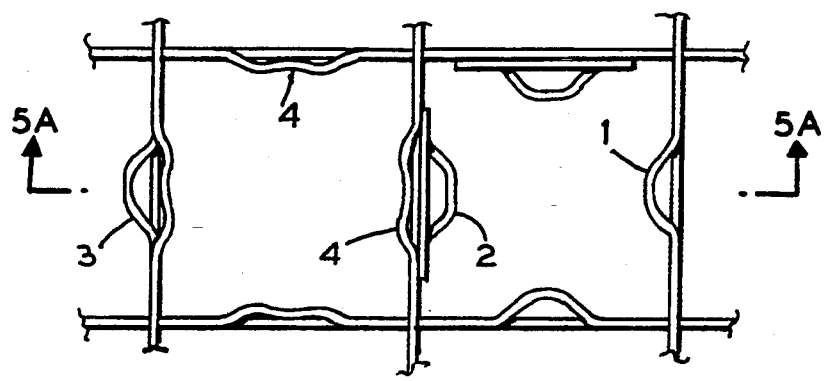
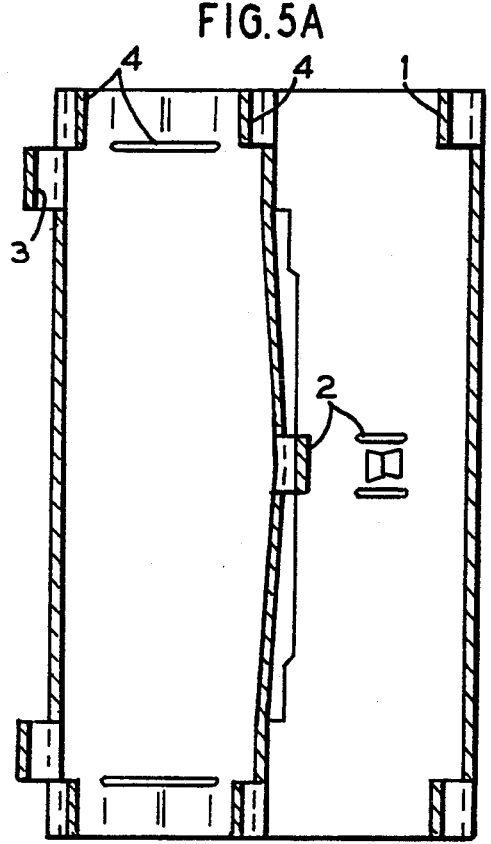
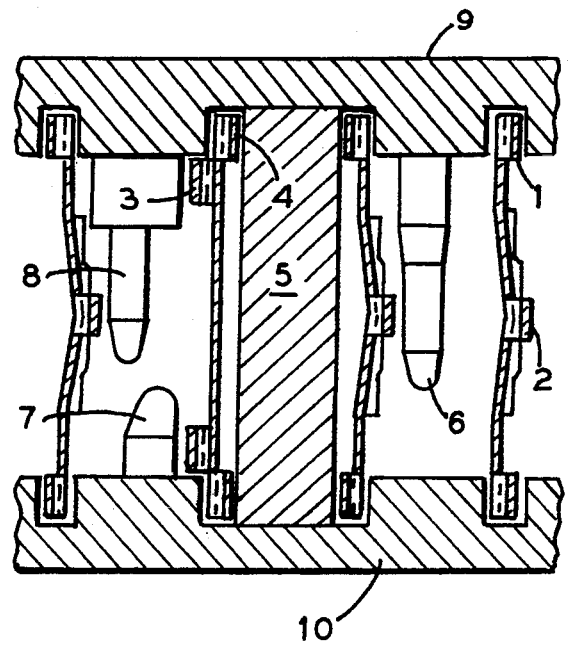

SPACER GRID CELL FIXTURE SYSTEM

BACKGROUND OF THE INVENTION

1. Field of the Invention

The invention is generally related to nuclear fuel assemblies and particularly to the fabrication of spacer grids used in nuclear fuel assemblies.

2. General Background

Fuel assemblies for nuclear reactors are formed from a number of fuel rods held in position radially by spacer grids located along the length of the fuel rods. The spacer grids are formed from slotted metal strips containing stamped features, which are crisscrossed on edge to define individual cells for each fuel rod. The crossing metal strips are aligned at approximate right angles to each other and then welded together. The alignment method currently used is generally known as the pinning and framing process. After the metal strips are placed in the crisscross pattern, the next step is the insertion of pins into the individual cells of the egg crate. The "egg crate" is used to refer to the unwelded spacer grid inner structure comprised of intersecting, slotted strips that form a checkerboard-like array of cell locations. A tooling pin is then inserted into each cell. The pin interfaces with the base strip areas, as opposed to the contact points in each cell, to position and hold the strips in the proper orientation. The pinned egg crate is then placed into a welding frame that contains pressure pads which secure the egg crate to the frame. Pressure applied directly to the outer tooling pins is transferred to the inner locations through each strip and the adjacent pins. The load is repeatedly applied and released to act as a settling process to remove any tiny gaps or misalignments that may be present. The grid is then ready to be welded. This leaves a need for an improved fixturing system that can be used to align the egg crate with a minimum of steps and equipment, and provide greater dimensional control.

SUMMARY OF THE INVENTION

The present invention addresses the above need for a more straightforward manner in which to prepare the spacer grid egg crate for intersection welding. What is provided is a weld fixture for receiving and aligning the fuel rod contact points of a nuclear fuel bundle spacer grid, which eliminates the individual pin placement and settlement process in the previous equipment. Two plates each have a series of intermittent intersecting slots on one side used to align and position the fuel rod contact points referred to as outboard hardstops. The intermittent slots are not equally spaced, and the slot pitch is different in each intersecting direction to account for shrinkage during the welding process. One plate has a bore therethrough at each corner and a counterbore in a selected number of the polygons defined by the intermittent slots. A second plate has a bore therethrough at each corner and a counterbore in each of the polygons formed by the intermittent slots. Both plates have bores therethrough substantially at the intersection of the slots. A guide rod is received through each corner bore such that the intersecting slots on each plate are facing and aligned with each other. The guide rod in the orientation indicator corner is larger than the others to assure that the two fixture plates are properly oriented during assembly. Guide cell pins are positioned on the first plate in the recessed milled areas referred to as guide tube cell locations. Short alignment pins, located in counterbores in the polygons formed by the slots, are used to align and position fuel rod contact points referred to as inboard hardstops in the required locations on the first plate. The second plate contains tapered alignment pins, located in counterbores in the polygons formed by the slots, which are used to align and position fuel rod contact points referred to as softstops, with the exception of locations that also require positioning of an inboard hardstop, in which a combination pin is used to align and position both contact points simultaneously. The slots and assorted pins properly align the contact points of the spacer grid and the two plates are bolted together to secure the spacer grid in place. Laser welding of the interior intersections of the strips is accomplished by directing a laser beam through the bores at the slot intersections.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

FIG. 5 is a plan view of the guide tube and adjacent fuel rod cells in a spacer grid.

FIG. 5A is a view taken along lines 5A in FIG. 5.

FIG. 6 is a section view showing the fixturing of the guide tube and adjacent cells.

DETAILED DESCRIPTION OF THE PREFERRED EMBODIMENT

Figure 8:
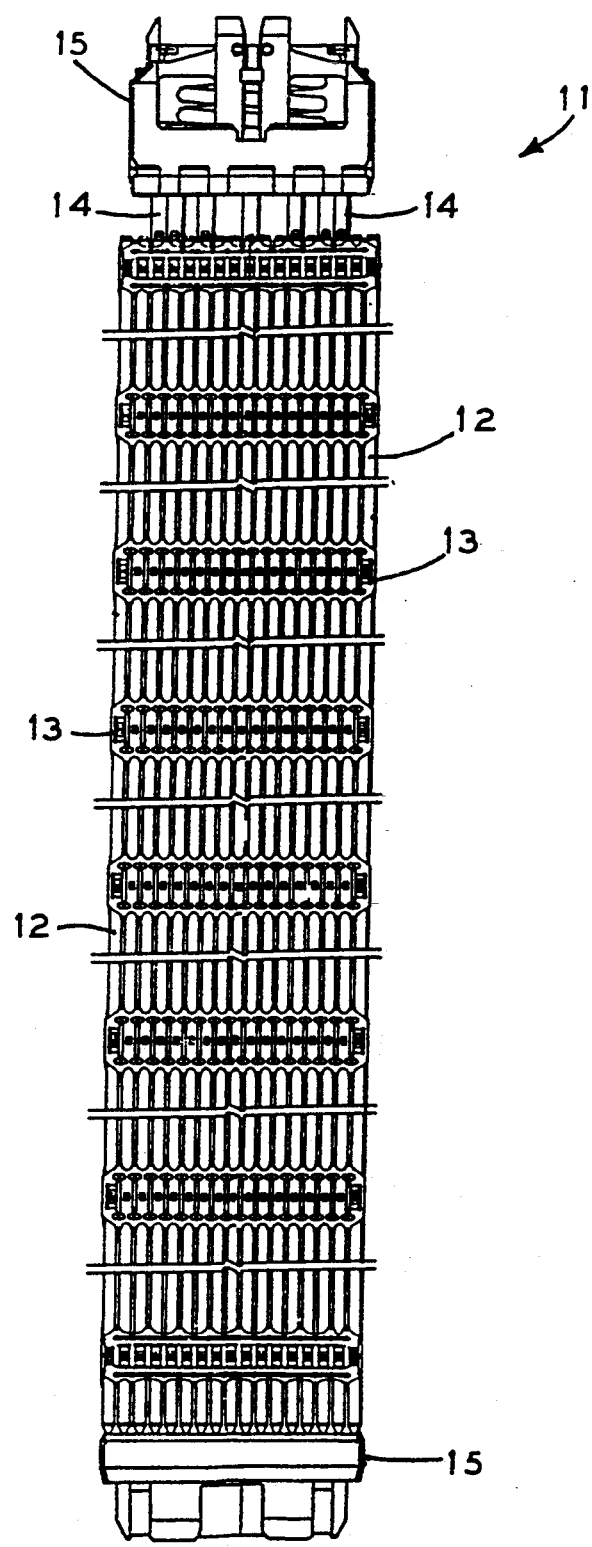
FIG. 8 is a side view of a typical fuel assembly.

FIG. 8 illustrates a typical nuclear fuel assembly 11 that is generally comprised of a plurality of fuel rods 12, grid assemblies or spacer grids 13, guide tubes 14, and end fittings 15. Spacer grids 13 provide support to fuel rods 12 while still allowing maximum surface area contact of fuel rods 12 with coolant flowing through the individual cells of the spacer grids.

Figure 9:
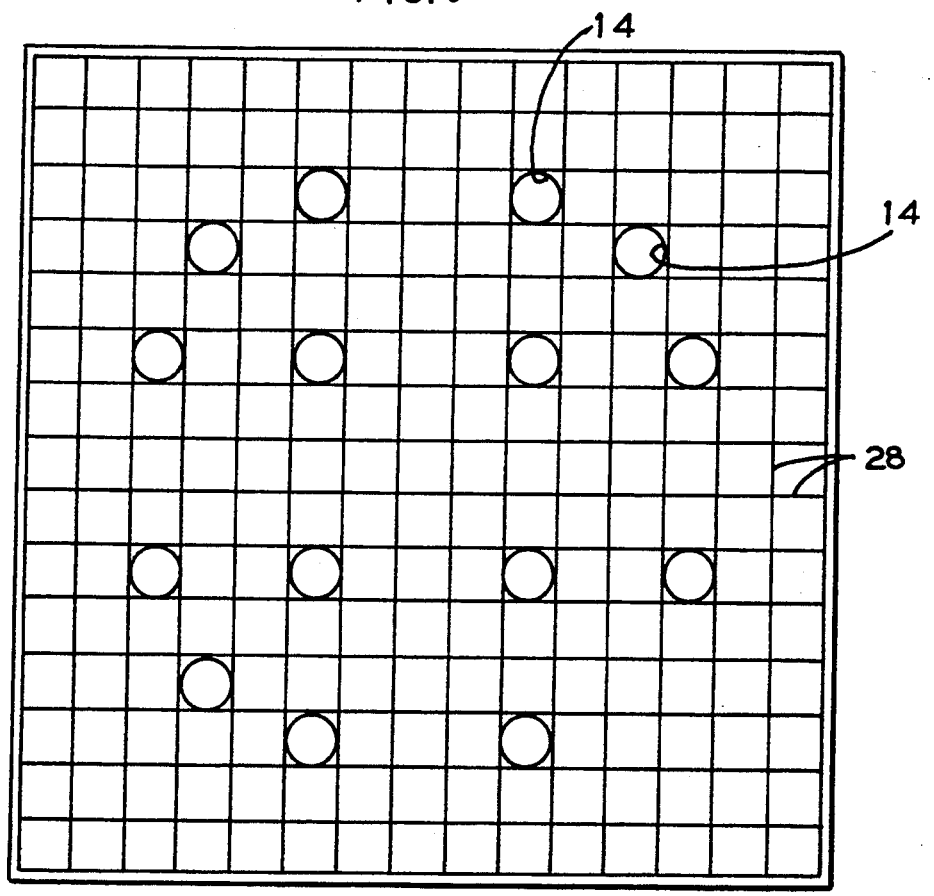
FIG. 9 is a schematic plan view of a spacer grid.
Figure 9A:
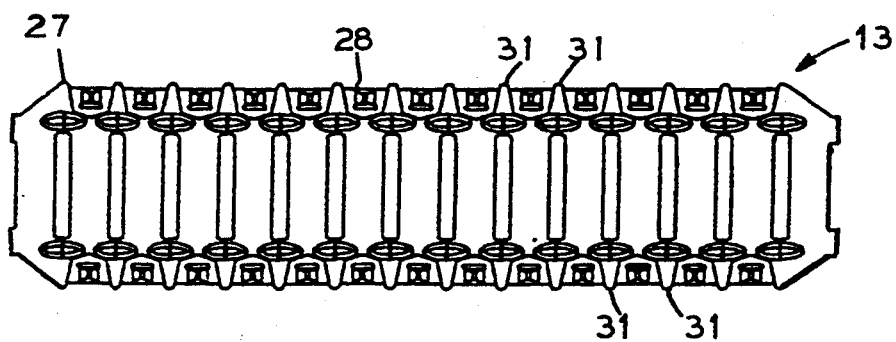
FIG. 9A is a side view of a spacer grid.

A typical spacer grid 13 is depicted in FIG. 9 and 9A. Strips 28 are arranged to define a plurality of square or rectangular cells that receive fuel rods 12 as seen in FIG. 8. The center cell is normally used in a fuel assembly to receive an instrumentation tube. A plurality of other cells are used to receive guide tubes 14. As seen in FIG. 9A, strips 28 contain end tabs 27 and weld tabs 31.

Figure 1:
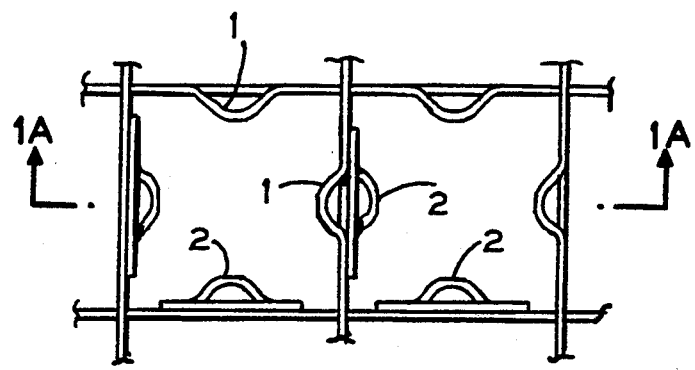
FIG. 1 is a plan view of a typical fuel rod cell in a spacer grid.
Figure 1A:
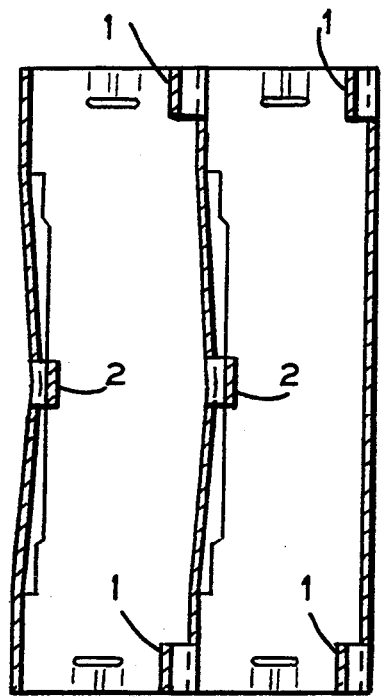
FIG. 1A is a view taken along lines 1A in FIG. 1.
Figure 2:
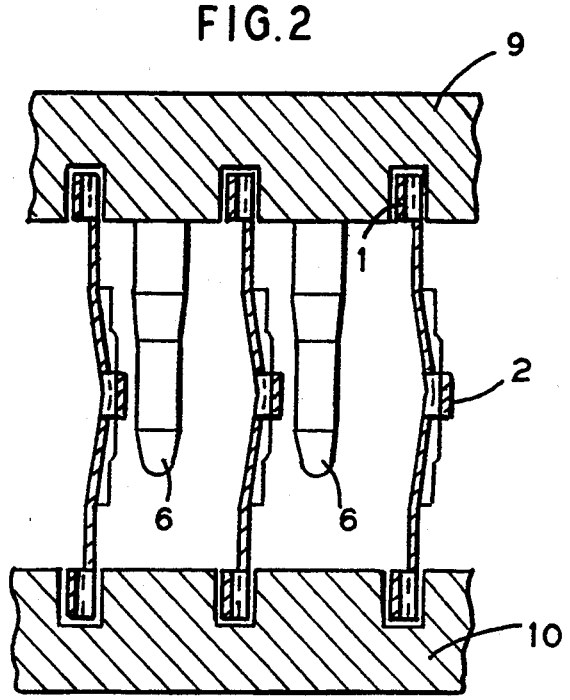
FIG. 2 is a section view showing the fixturing of a typical fuel rod cell.
Figure 3:
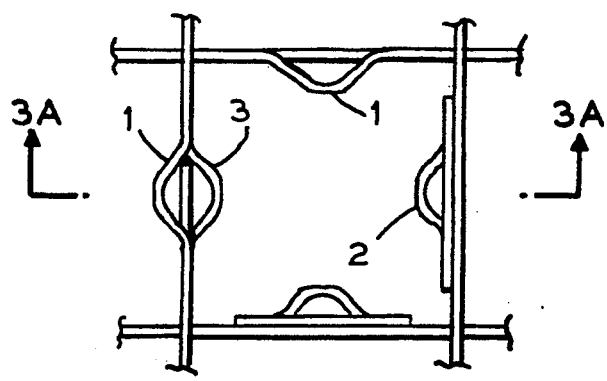
FIG. 3 is a plan view of the cell adjacent to the double hardstop strip in a spacer grid.
Figure 3A:
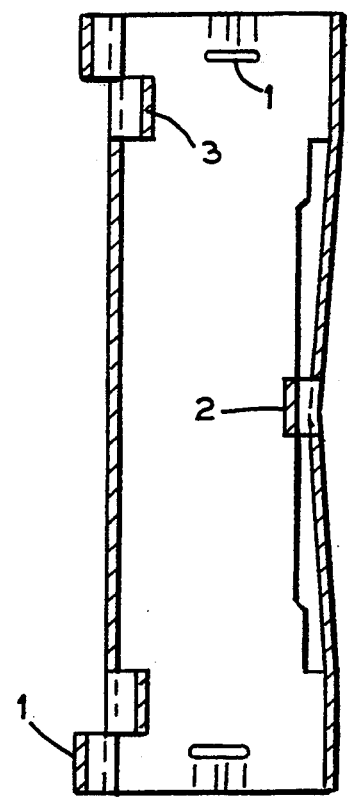
FIG. 3A is a view taken along lines 3A in FIG. 3.
Figure 4:
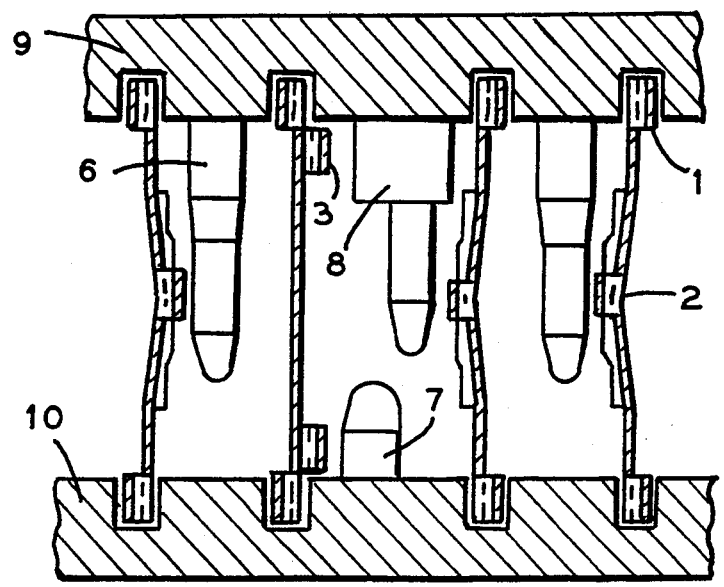
FIG. 4 is a section view showing the fixturing of cells adjacent to the double hardstop strip.

There are several different types of fuel rod contact points within a spacer grid, such as hardstops, softstops, and guide tube saddles. The spacer grid 13 can be described as a square array of grid cells comprised of combinations of these features. The configurations form three different type of cells, those being the fuel rod cell, guide tube cell, and instrument tube cell. While guide tube cells all have the same configurations and there is only one instrument tube configuration (similar to the guide tube configuration), the fuel rod cell has several different possible configurations. The different fuel rod configurations are:

a) Inside normal cell (FIG. 1 and 1A)—There are six contact points, four outboard hardstops 1 at or near the top and bottom of the strip, and two softstops 2. FIG. 2 depicts this type cell fixtured by the invention. The outboard hardstops 1 are fixtured by the upper and lower slotted plates of the invention, and the softstops are positioned by the softstop alignment pin of the invention.

b) Special double Hardstops (FIG. 3 and 3A)—There are six contact points, two outboard hardstops 1 on one wall at the top and bottom of the strip, two inboard hardstops 3 on another wall inboard near the top and bottom of the strip, and two softstops 2. FIG. 4 depicts this type cell fixtured by the invention. The outboard hardstop locations are positioned by the upper and lower slotted plates of the invention. The invention uses several types of alignment pins around the double hardstop locations. The normal softstop alignment pin of the invention is used in adjacent cells, and short alignment pins are used to fixture the inboard hardstops, and a special combination pin is used to simultaneously position the upper inboard hardstop and the softstop.

c) Adjacent to Guide tubes (FIG. 5 and 5A)—There are six contact points, two outboard hardstops 1 on one wall at the top and bottom of the strip, two inboard hardstops 3 on the wall inboard of the guide tube saddles near the top and bottom of the strip, and two softstops 2. FIG. 6 depicts this type cell fixtured by the invention. The outboard hardstops 1 are positioned by the upper and lower slotted plates of the invention. In the guide tube cell, a sizing pin is used to set the cell size and contact points to allow proper insertion and fit-up of the guide tubes. In adjacent cells, normal softstop alignment pins are used in two cell locations, and short alignment pins and combination pins are used in the other two locations surrounding the guide tube cells.

Figure 10:
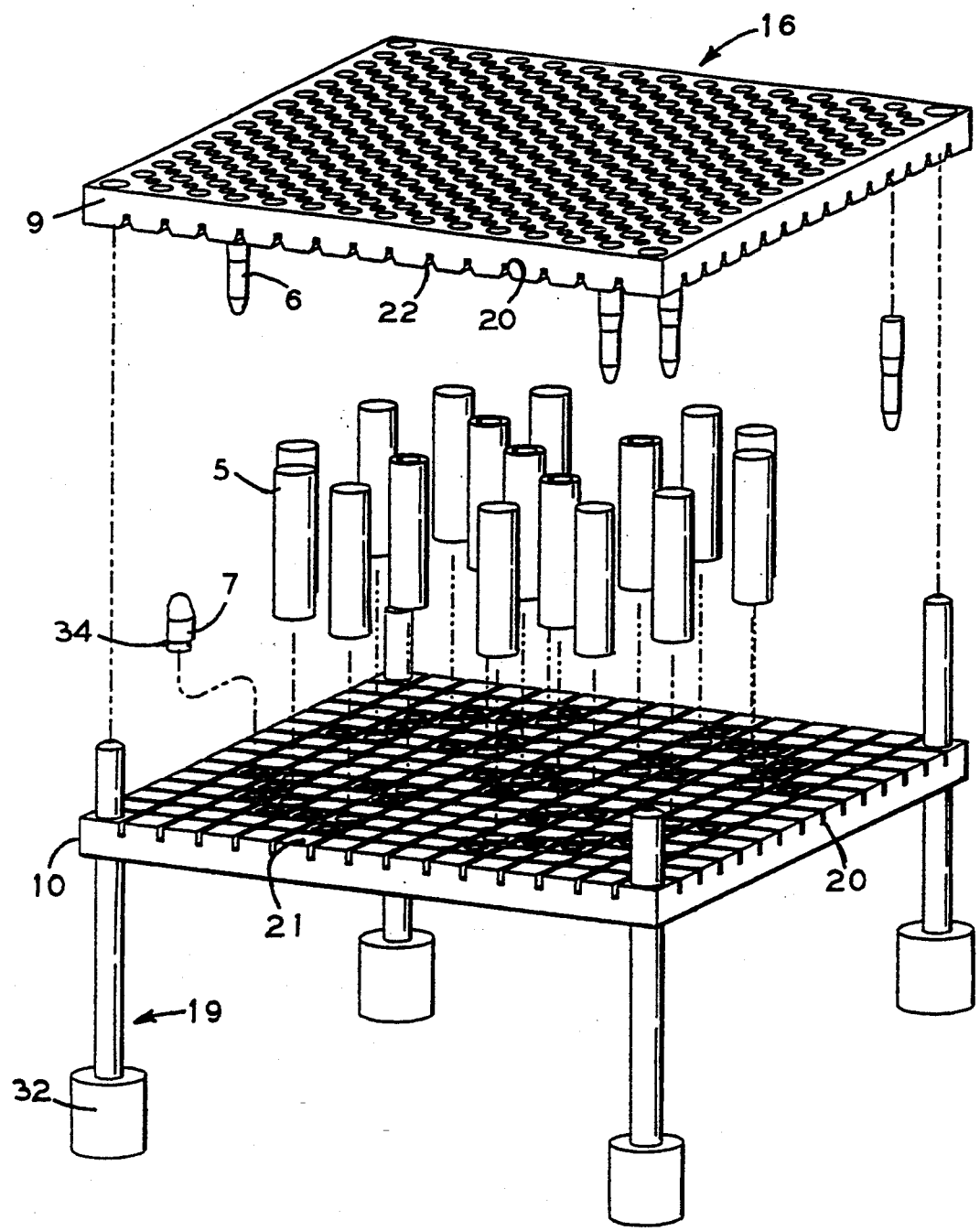
FIG. 10 is an exploded view of the invention.

It is seen in FIG. 10 that the invention is generally indicated by the numeral 16. Weld fixture 16 is generally comprised of first plate 10, second plate 9, guide rods 19, guide cell pins 5, and alignment pins 6, 7, 8.

Figure 7:
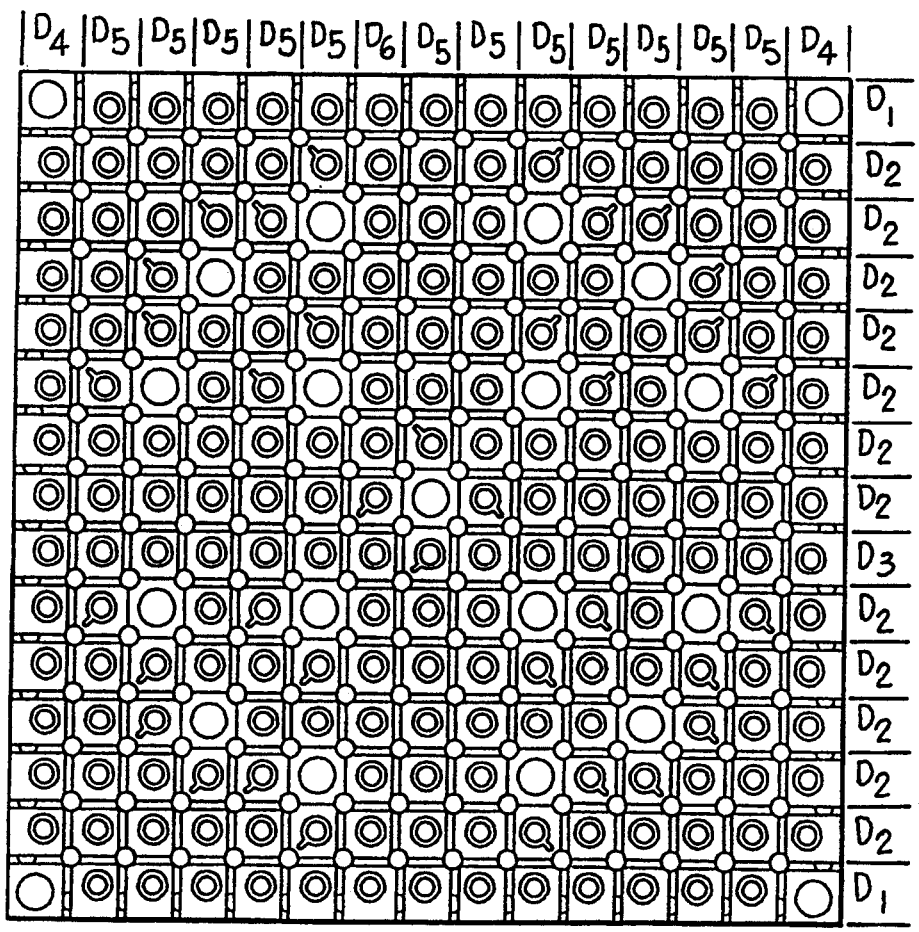
FIG. 7 is a plan view of one of the plates of the invention that illustrates the pitch difference in the slots.
Figure 11:
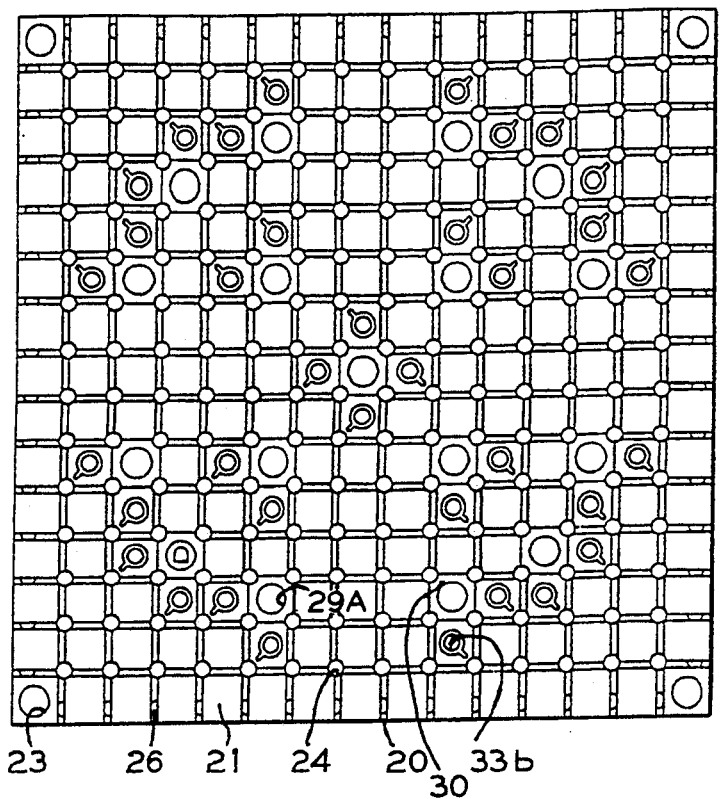
FIG. 11 is a plan view of the bottom plate of the invention.
Figure 12:
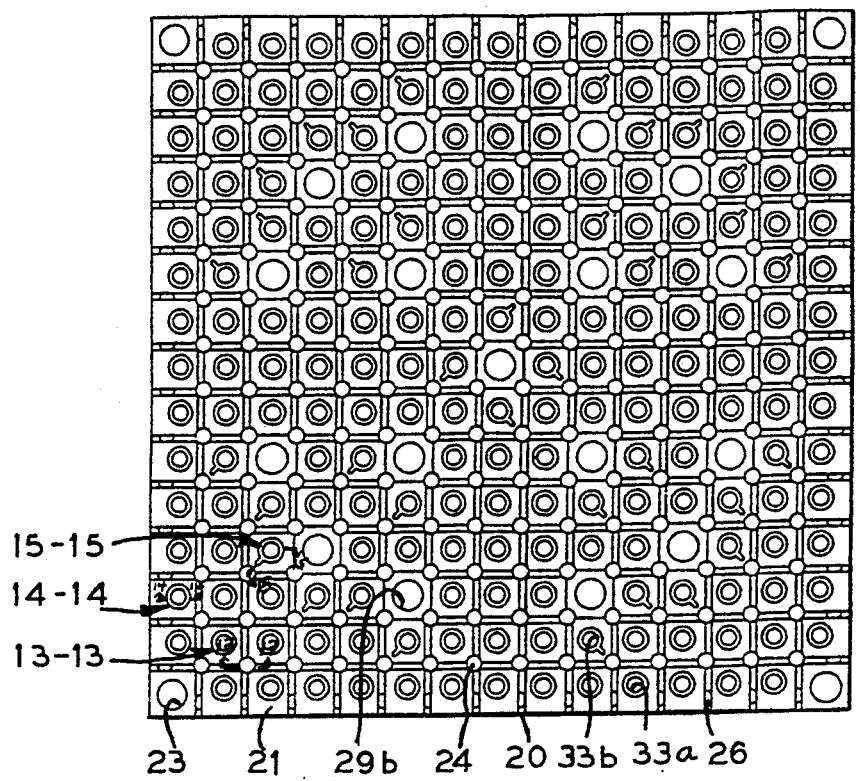
FIG. 12 is a plan view of the top plate of the invention.
Figure 13:
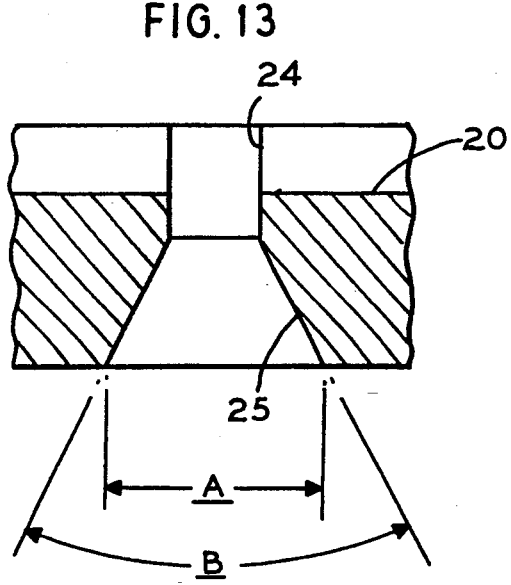
FIG. 13 is a section view taken along lines 13—13 of FIG. 12.

First and second plates 10 and 9 are each provided with a plurality of intermittent intersecting slots 20 on one side of each plate, as shown in FIGS. 10, 11, and 12, that precisely align and position the fuel rod contact points 1 referred to as outboard hardstops. The slots 20 preferably intersect at right angles to define a plurality of raised polygons 21. As shown in FIG. 7, the intermittent slots are not equally spaced on either side because of the double hardstop strip. In addition, the spacing varies in one direction versus the other to ensure alignment of the stops by accounting for different strip shrinkage on the slotted versus solid side of the spacer grid egg crate. Therefore, $D_1 \neq D_2 \neq D_3 \neq D_4 \neq D_5 \neq D_6$. As best seen in FIG. 10, slots 20 preferably have a chamfered upper edge 22. For ease of illustration, chamfered upper edge 22 is only shown on second plate 9. In the preferred embodiment, the chamfer angle is thirty-five degrees to provide a 0.061 inch distance between the inner and outer most portion of the chamfer. Plates 10 and 9 each have a bore 23 therethrough in the polygon defined at each corner. Plates 10 and 9 are also provided with a bore 24 therethrough substantially at the intersections of slots 20. As best seen in FIG. 13, bores 24 are preferably provided with chamfered edge 25 on the sides of plates 10 and 9 opposite slots 20. As indicated by dimensions A and B respectively, chamfered edges 25 have a preferred diameter of 0.500 inch and a chamfer angle of sixty degrees. As seen in FIGS. 11 and 12, plates 10 and 9 are provided with bores 26 therethrough adjacent the outer edges of plates 10 and 9 and centered in slots 20. Bores 26 are drilled in the plates on the opposite side of slots 20. Bores 26 receive end tabs 27 on inner strips 28 of the spacer grid assembly, seen in FIG. 9A.

Plates 10 and 9 are respectively provided with bores 29a and 29b therethrough in all recessed milled areas 30 referred to as guide tube cell locations. Bores 29b are sized to receive bolts or screws through plate 9 while bores 29a are threaded for receiving the threaded end of the bolts or screws and holding the plates together after the strips 28 that form the spacer grid are positioned between the plates 10 and 9. The recessed milled areas 30 that are provided with bores 29a,b correspond to component guide tube and instrument tube locations in a spacer grid assembly of a nuclear fuel bundle assembly. The milled recessed areas 30 are cut approximately to the depth of the slots 20.

Guide cell pins 5 are sized to be received in the recessed milled areas 30 that have bores 29a,b therein. A selected number of guide cell pins 5, five in the preferred embodiment, are hollow as indicated in FIG. 10. The hollow pins receive the through bolts and are positioned to evenly distribute the pressure when plates 10 and 9 are bolted together on the assembled strips 28. In the preferred embodiment, guide cell pins 5 are slightly taller than strips 28 so that when plates 10 and 9 are bolted together the load is carried by the guide cell pins 5 and not strips 28. The end tabs 27 are received in bores 26 and weld tabs 31 extend into bores 24 without any distortion load being placed on the strips.

Guide rods 19 are sized to fit closely through corner bores 23 in plates 10 and 9. This aligns slots 20 on the plates, which causes strips 28 to be forced into proper alignment as second plate 9 is moved towards first plate 10 on guide rods 19. Base 32 is provided on one end of guide rods 19 to serve as a rest for first plate 10 during fixturing of strips 28 into plates 10 and 9.

Figure 14:
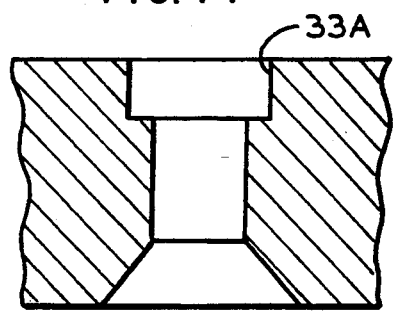
FIG. 14 is a section view taken along lines 14—14 of FIG. 12.
Figure 15:
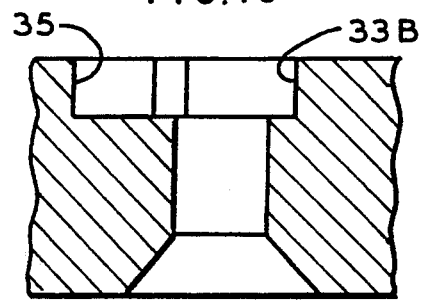
FIG. 15 is a section view taken along lines 15—15 of FIG. 12.

Second plate 9 is provided with counterbores 33a,b in polygons not having bores 23 or 29b. Bores 33a,b, seen in section in FIG. 14 and 15, are sized to receive flat head screws not shown which are threaded into alignment pins 6, 7, and 8 seen in FIG. 2, 4, and 6. Alignment pins 6 are tapered inwardly away from the threaded end and are used to align and position fuel rod contact points referred to as softstops 2. As seen in FIG. 10, alignment pins 7 are shorter than pins 6 and are provided with an index pin 34 that extends radially from one end of the alignment pin. Pins 7 are sized for and positioned in polygons 21 in second plate 9 that correspond to those cells in spacer grid 13 that are used to align and position fuel rod contact points referred to as inboard hardstops 3. Since pins 7 do not extend the full height of spacer grid 13, corresponding pins 8 and bores 33b are provided for first plate 10. Pins 8 in second plate 9 are used for positioning in polygons with bores 33b that require simultaneous positioning of inboard hardstop and softstop contact points, and allow for corresponding pins 7 and bores 33b in first plate 10. As seen in FIG. 14 and 15, each bore 33b is different from bore 33a only in having radial notch 35 that receives index pin 34. The shape of short pin 7 and combination pin 8 are directly related to the position of the hardstops in the grid cells. Placing index pin 34 in notch 35 prevents turning of pins 7 and 8 during threading of the flat head screw and maintains the proper orientation of pins 7 and 8 throughout use. In the preferred embodiment an alignment pin is provided in each polygon not occupied by a guide cell pin in second plate 9, and in each polygon in first plate 10 with bore 33b.

In operation, weld fixture 16 is designed to align and position all the critical fuel rod contact points within a spacer grid during the intersection welding process and not to position any of the actual base strip locations. First plate 10 has a guide rod 19 placed through each corner bore 23 such that slots 20 face upward. Plates 10 and 9 mirror each other with regard to slot spacing. However, the spacing between slots 20 is not equal on either side of the plates. This requires a means of insuring that plates 10 and 9 are properly oriented relative to each other to achieve the proper slot orientation between plates. This is achieved by having one corresponding bore 23 in the corner of each plate larger than the remaining bores 23 and the diameter of one of guide rods 19 of a corresponding larger diameter. This insures proper orientation of plates 10 and 9 relative to each other. The spacer grid egg crate, which is a plurality of crisscrossing strips 28, is placed on first plate 10 so that each strip 28 is received in and resting on the bottom of an individual slot 20 and end tabs 27 and weld tabs 31 are respectively received in edge bores 26 and slot intersection bores 24. This assures that all strip contact points 1, 2, 3, and 4 are at the same elevations (relative to each other) and are secure in first plate 10. As seen in FIG. 2, 4, and 6, outboard hardstops 1 at the upper edges of strips 28 are received in slots 20 for alignment. Sizing of the slots 20 to receive the outboard hardstops 1 provides for the proper alignment and positioning of the aforementioned fuel rod contact points. Guide cell pins 5 are then inserted into the locations that correspond to guide tube and instrument tube locations in the nuclear fuel assembly to assure that the saddles in strips 28 are properly oriented for welding. The hollow guide cell pins are preferably positioned as shown in FIG. 10 at the corresponding instrument tube location, center cell, and at four outer locations having bores 29a. Second plate 9 is then received on guide rods 19 such that slots 20 face first plate 10 and is slowly lowered onto the egg crate. Second plate 9 bottoms out on guide cell pins 5 without transferring a load to the egg crate while still receiving the strips and tabs in their corresponding slots as referred to above. During the lowering of second plate 9, alignment pins 6, 7, and 8 each move into an individual cell defined by the egg crate to properly align and position all of the fuel rod contact points not positioned by the features in the first plate 10. It should be understood that pins 6, 7, and 8 will not necessarily contact all of the hardstops or softstops in the spacer grid. Contact in some areas of the spacer grid results in proper alignment in other areas, with all of the pins being required to insure proper alignment and positioning throughout the spacer grid. Bolts are then inserted through plate 9 and hollow pins 5 at selected locations and threaded into bores 29b in first plate 10 to secure the plates and egg crate in position. Guide rods 19 are then removed and weld fixture 16 is placed in a welding frame for welding of the interior intersections of the grid strips. In the welding process a laser beam is directed into each slot intersection bore 24 through chamfered portion 25 onto weld tabs 31 which melt and secure strips 28 together to form the interior section of a spacer grid.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A weld fixture for receiving and aligning the inboard and outboard fuel rod contact points within each cell of a nuclear fuel bundle spacer grid, said weld fixture comprising:

a. a first and second plate each having a plurality of unequally spaced intersecting slots defining polygons on one side of each plate, the slots engaging and positioning the outboard fuel rod contact points in each cell of the spacer grid when positioned between said first and second plates;

b. a plurality of pins attached to said first and second plates within defined polygons that do not correspond to guide tube or instrument locations in the spacer grid, and sized and shaped such that said pins align and position the inboard fuel rod contact points of each cell contained on the nuclear fuel bundle spacer grid when positioned between the first and second plates; and c. said first and second plates each having a bore therethrough substantially at each of the intersections of the slots.

2. The weld fixture of claim 1, wherein said first and second plates each have a bore therethrough at each corner sized to receive a guide rod.

3. The weld fixture of claim 1, further comprising a guide cell pin received in each cell of the spacer grid that corresponds to guide tube and instrument tube locations, said guide cell pins being taller than the spacer grid received in said weld fixture.

4. The weld fixture of claim 3, wherein a selected number of said guide cell pins are hollow.

5. The weld fixture of claim 1, wherein the bores through said plates substantially at the intersection of the slots are chamfered on the side of said plates opposite the slots.

6. The weld fixture of claim 1, wherein the slots in said first and second plates are chamfered.

7. The weld fixture of claim 1, wherein said first and second plates are provided with a bore therethrough in each slot adjacent the outer edges of said plates.

8. A weld fixture for receiving and aligning the inboard and outboard fuel rod contact points within each cell of a nuclear fuel bundle spacer grid, said weld fixture comprising:

a. a first and second plate each having a bore therethrough at each corner sized to receive a guide rod and a plurality of unequally spaced intersecting slots defining polygons on one side of each plate, the slots engaging and positioning the outboard fuel rod contact points in each cell of said spacer grid when positioned between said first and second plates;

b. a plurality of pins attached to said first and second plates within defined polygons that do not correspond to guide tube or instrument locations in the spacer grid, and sized and shaped such that said pins align and position the inboard fuel rod contact points of each cell contained on the nuclear fuel bundle spacer grid when positioned between the first and second plates;

c. said first and second plates each having a bore therethrough substantially at each of the intersections of the slots; and d. a guide cell pin received in each cell of the spacer grid that corresponds to guide tube and instrument tube locations, said guide cell pins being taller than the spacer grid received in said weld fixture.

9. The weld fixture of claim 8, wherein the bores through said plates substantially at the intersection of the slots are chamfered on the side of said plates opposite the slots.

10. The weld fixture of claim 8, wherein the slots in said first and second plates are chamfered.

11. The weld fixture of claim 8, wherein said first and second plates are provided with a bore therethrough in each slot adjacent the outer edges of said plates.

12. The weld fixture of claim 8, wherein a selected number of said guide cell pins are hollow.

13. A weld fixture for receiving and aligning the inboard and outboard fuel rod contact points within each cell of a nuclear fuel bundle spacer grid, said weld fixture comprising:

a. a first and second plate each having a bore therethrough at each corner sized to receive a guide rod and a plurality of unequally spaced intersecting, chamfered slots defining polygons on one side of each plate, the slots engaging and positioning the outboard fuel rod contact points in each cell of said spacer grid when positioned between said first and second plates;

b. a plurality of pins attached to said first and second plates within defined polygons that do not correspond to guide tube or instrument locations in the spacer grid, and sized and shaped such that said pins align and position the inboard fuel rod contact points of each cell contained on the nuclear fuel bundle spacer grid when positioned between the first and second plates;

c. said first and second plates each having a bore therethrough substantially at each of the intersections of the slots with the bores being chamfered on the side of the plates opposite the slots; and d. a guide cell pin received in each cell of the spacer grid that corresponds to guide tube and instrument tube locations, said guide cell pins being taller than the spacer grid received in said weld fixture.

14. The weld fixture of claim 13, wherein said first and second plates are each provided with a bore therethrough in each slot adjacent the outer edges of said plates.

15. The weld fixture of claim 13, wherein a selected number of said guide cell pins are hollow.

* * * * *